United States Patent Office 2,745,817
Patented May 15, 1956

2,745,817

DENTAL MATERIAL

Heino Logemann, Leverkusen, and Wilhelm Becker and Otto Bayer, Leverkusen-Bayerwerk, Germany, assignors to Farbenfabriken Bayer Aktiengesellschaft, Leverkusen, Germany, a corporation of Germany No Drawing. Application March 7, 1951,
Serial No. 214,428

Claims priority, application Switzerland March 7, 1950

3 Claims. (Cl. 260—45.5)

The present invention relates to the production of dental material from polymerizable materials.

It is known in the art to produce dental material, such as dental filling material, artificial teeth, dentures, from a plastic mixture of liquid polymerizable monomeric or partially polymerized vinyl derivatives or polymeric solid vinyl derivatives. For this purpose mixtures of monomeric and polymeric methacrylic acid esters have proved to be especially suitable. Other resinous mixtures such as those containing or consisting of acrylic acid ester, styrene, chlorine-containing acrylic acid ester etc. can be used to produce dental materials. Furthermore, it is feasible to employ other high-molecular weight substances, such as, for instance, cellulose derivatives in admixture with monomeric polymerizable vinyl compounds for such purposes. All the compounds used according to this process display hydrophobic properties when polymerized.

The above-described compositions may be polymerized with oxidizing activators within either a long or a short period, the length of time depending on the temperature applied. The time of polymerization may be shortened by the employment of the so-called redox activators which are described in literature and many Letters Patents (cf. for instance, Swiss Patents 230,706, 233,040, 255,978, 258,457, United States Patent 2,462,354), and carried out at a temperature tolerable to the human body to such an extent that said compositions may be used as tooth filling material or as adhesives for tooth fillings, for repairing prostheses or also for fixing crowns and bridges made of plastics. Furthermore, it is possible to mold said compsitions into artificial teeth and to affix them in the mouth to stumps of teeth by polymerization. It has also been attempted to affix artificial teeth made of other materials to stumps of teeth or artificial dentures by means of said compositions. However, said compositions have not found wide application since they shrink to a considerable extent after polymerization and since they do not satisfactorily adhere to the bases to which they are attached.

In accordance with the present invention it has been found that the disadvantages associated with the prior art are eliminated by adding to the above-described compositions polymerizable compounds in monomeric or polymeric form which yield polymers soluble or capable of swelling in water. These compounds may be employed either in mixture or as copolymers with the hydrophobic vinyl compounds. Especially suitable additional substances according to the invention are the acrylic acid amides or methacrylic acid amides in monomeric or polymeric form. However, compounds yielding other hydrophilic polymers may also be employed, such as for instance, monomeric or polymeric acroleins, monomeric or polymeric acrylic acid hydroxy ethyl esters, monomeric or polymeric vinyl pyrrolidones, monomeric or polymeric vinyl pyridines. These compounds are added to the above-described customarily used compositions, preferably in quantities up to 10% by weight calculated on the total weight of monomeric and polymeric substances. The new compositions containing such relatively small additions show surprisingly improved adhesion and a decreased shrinking capacity after polymerization as compared with the material hitherto used in the art. The new plastics may further contain additional polymerizable compounds containing two or more vinyl groups, such as for instance, diacrylates of ethylene diamine, allyl esters of methacrylic acid etc. Furthermore, the usual additional substances may be incorporated in these plastics. Thus, for instance, it is possible to incorporate dyes imparting a natural color shade, and substances causing turbidity and fillers effecting a greater hardness and abrasion resistance, such as for instance, titanium dioxide, zinc oxide or other hard mineral substances. The properties of the new plastics may be further favourably influenced by the addition of inorganic or organic fibers.

The invention is further illustrated by the following examples without being restricted thereto.

*Example 1*

2 parts of a spheroidal polymerizate consisting of 70 parts of methacrylic acid methyl ester and 30 parts of acrylic acid butyl ester are mixed with 1 part of monomeric methacrylic acid methyl ester with the addition of 0.1 part of acrylic acid amide, 0.03 part of toluence sulfinic acid, 0.02 part of hydroquinone and 0.02 part of cumol peroxide to form a plastic mixture setting in a few minutes to a mass firmly adhering to its support. After complete hardening the plastic mass shows good mechanical strength.

*Example 2*

The polymerizate in Example 1 is replaced by that obtained by polymerization of 50 parts of methacrylic acid butyl ester and 50 parts of methacrylic acid methyl ester. 2 parts of this polymerizate are kneaded with 1 part of monomeric methacrylic acid methyl ester and 0.01 part of acrylic acid amide. As activator there is used in known manner a combination of benzoyl peroxide and tricyclohexyl-amine, the benzoyl peroxide being absorbed on the polymerizate and the amine being dissolved in the monomeric methacrylic acid methyl ester.

*Example 3*

90 parts of methacrylic acid methyl ester and 10 parts of acrylic acid amide are polymerized to form a fine-grained polymerizate. 2 parts of this polymerizate are swollen in 1 part of monomeric methacrylic acid methyl ester, whereafter the activators described in Example 1 or 2 are added. This mass is used as a tooth filling material, giving fillings of great adherence to the wall of the cavity.

We claim:

1. A composition for use in making dental fillings comprising a mixture of (I) a polymethacrylic acid ester (II) a monomeric methacrylic acid ester and (III) an amide of the group consisting of acrylamide and methacrylamide, said amide being present in an amount up to about 10%, by weight of the composition.

2. A composition for use in making dental fillings and other dental repairs comprising a mixture of (I) a polymethacrylic acid ester containing between about 0 and 10% by weight of an acrylamide component and (II) a monomeric methacrylic acid ester containing by weight between about 0 and 10% of an acrylamide component, at least one of the components I and II having an acrylamide component, said acrylamide component being selected from the group consisting of acrylamide and methacrylamide.

3. A composition according to claim 1 containing as activator a redox system.

References Cited in the file of this patent

UNITED STATES PATENTS

| | | |
|---|---|---|
| 2,067,234 | Gordon et al. | Jan. 12, 1937 |
| 2,265,236 | Kistler | Dec. 9, 1941 |
| 2,310,132 | Underdahl | Feb. 2, 1943 |
| 2,373,488 | Marks | Apr. 10, 1945 |
| 2,434,054 | Roedel | Jan. 6, 1948 |
| 2,558,139 | Knock et al. | June 26, 1951 |
| 2,569,767 | Knock | Oct. 2, 1951 |
| 2,597,202 | Tawney | May 20, 1952 |
| 2,620,324 | Coover et al. | Dec. 2, 1952 |

FOREIGN PATENTS

| | | |
|---|---|---|
| 584,857 | Great Britain | Jan. 24, 1947 |

OTHER REFERENCES

Hackh's Chemical Dictionary, Blakiston, 1944, 3rd edition, page 17.